United States Patent
Ou Yang et al.

(10) Patent No.: US 10,656,030 B2
(45) Date of Patent: May 19, 2020

(54) TEMPERATURE SENSING DEVICE CAPABLE OF AUTOMATICALLY SWITCHING MODE AND METHOD THEREOF

(71) Applicant: AVITA CORPORATION, New Taipei (TW)

(72) Inventors: Hsing Ou Yang, New Taipei (TW); Hsuan Hao Shih, New Taipei (TW); Ta Chieh Yang, New Taipei (TW)

(73) Assignee: AVITA CORPORATION, New Taipei (TW)

(*) Notice: Subject to any disclaimer, the term of this patent is extended or adjusted under 35 U.S.C. 154(b) by 211 days.

(21) Appl. No.: 15/806,291

(22) Filed: Nov. 7, 2017

(65) Prior Publication Data
US 2018/0128691 A1    May 10, 2018

(30) Foreign Application Priority Data

Nov. 7, 2016 (TW) .............................. 105136117 A
Oct. 17, 2017 (TW) .............................. 106135483 A

(51) Int. Cl.
G01K 13/00        (2006.01)
(52) U.S. Cl.
CPC .................................. G01K 13/002 (2013.01)
(58) Field of Classification Search
CPC .................................................. G01K 2215/00
See application file for complete search history.

(56) References Cited

U.S. PATENT DOCUMENTS

| | | | |
|---|---|---|---|
| 7,828,743 B2* | 11/2010 | Fraden | A61B 5/01 600/549 |
| 8,816,875 B2* | 8/2014 | Hiramatsu | G01K 13/002 340/687 |
| 9,436,306 B2* | 9/2016 | Oguri | H04W 52/0254 |
| 9,690,362 B2* | 6/2017 | Leimbach | G05F 1/563 |
| 2009/0058664 A1 | 3/2009 | Park et al. | |

(Continued)

FOREIGN PATENT DOCUMENTS

| | | |
|---|---|---|
| JP | 61182543 | 8/1986 |
| JP | H0822361 | 1/1996 |

(Continued)

*Primary Examiner* — Clayton E. LaBalle
*Assistant Examiner* — Leon W Rhodes, Jr.
(74) *Attorney, Agent, or Firm* — Raymond Y. Chan; David and Raymond Patent Firm

(57) ABSTRACT

The present disclosure illustrates a temperature sensing device capable of automatically switching mode, and a method thereof. The temperature sensing device includes a control unit configured to determine that the temperature sensing device is to enter or leave from a first mode or a second mode; a power supply unit configured to provide power required by the temperature sensing device; a power circuit including the power supply unit and is electrically connected to the control unit for power supply. The power circuit includes a detection unit electrically connected to the power supply unit and the control unit, and the detection unit is configured to detect when the temperature sensing device is moved from a standing state, and enable the control unit to determine that the temperature sensing device is to leave from the first mode and enter the second mode.

14 Claims, 7 Drawing Sheets

(56) References Cited

U.S. PATENT DOCUMENTS

2012/0150482 A1 6/2012 Yildizyan
2015/0253200 A1 9/2015 Wang

FOREIGN PATENT DOCUMENTS

| JP | 2008502903 | 1/2008 |
|---|---|---|
| TW | I418335 | 8/2012 |
| TW | M508302 | 9/2015 |
| TW | M516053 | 1/2016 |

* cited by examiner

TEMPERATURE SENSING DEVICE CAPABLE OF AUTOMATICALLY SWITCHING MODE AND METHOD THEREOF

NOTICE OF COPYRIGHT

A portion of the disclosure of this patent document contains material which is subject to copyright protection. The copyright owner has no objection to any reproduction by anyone of the patent disclosure, as it appears in the United States Patent and Trademark Office patent files or records, but otherwise reserves all copyright rights whatsoever.

BACKGROUND OF THE PRESENT INVENTION

Field of Invention

The present disclosure relates to a power-on operation of a temperature sensing device. More particularly, the present disclosure relates to a temperature sensing device capable of automatically switching mode and a method thereof.

Description of Related Arts

In recent years, a conventional mercury thermometer is gradually replaced by an electronic thermometer is able to quickly and accurately measure a body temperature of human body. A power-on scheme of the conventional electronic thermometer is executed by a mechanical switch, such as a power switch, and the user must manually operate the power switch to start the power-on process of the conventional electronic thermometer, for example, the user can poke the power switch from an OFF location to an ON location, or press the power switch for a period. In order to use the measurement function, the user must wait completion of the power-on process of the electronic thermometer. Furthermore, the user also must manually operate the power-off scheme of the electronic thermometer, for example, the user can poke the power switch from the ON location to the OFF location; or, the conventional electronic thermometer can automatically power off after counting for a period in a standby mode. Furthermore, after the electronic thermometer completes the power-on process, the user must manually press a function button to start the temperature measurement function.

In order to improve user experience in operating the electronic thermometer, the electronic thermometer may be designed to enter the power-on process automatically or directly perform the temperature measurement function after the user picks up or moves the electronic thermometer from a standing state, so that the user does not need to manually operate the power-on process or press the function button.

SUMMARY OF THE PRESENT INVENTION

An objective of the present disclosure is to provide a temperature sensing device capable of automatically switching mode and a method thereof. In an embodiment, a detection unit is used to detect when the temperature sensing device is moved from a standing state, to enable the temperature sensing device to automatically enter a power-on process, thereby improving the user experience in operating the temperature sensing device.

Other objective of the present disclosure is to provide a temperature sensing device capable of automatically switching mode and a method thereof. A manner of sensing the user's touch is used to determine when the temperature sensing device is moved from the standing state, and the temperature sensing device can automatically start the power-on process after being touched, and then start or restart a temperature measurement function when being shaken.

In order to achieve the above-mentioned objectives, the present disclosure provides a temperature sensing device capable of automatically switching mode, and the temperature sensing device includes a control unit, power supply unit and a power circuit. The control unit is configured to determine that the temperature sensing device is to enter or leave from a first mode or a second mode. The power supply unit is configured to provide power required by the temperature sensing device. The power circuit includes the power supply unit and is electrically connected to the control unit to supply power. The power circuit includes a detection unit electrically connected to the power supply unit and the control unit, and the detection unit is configured to detect when the temperature sensing device is moved from a standing state, and enable the control unit to determine that the temperature sensing device is to leave from the first mode and enter the second mode. When the detection units detects that the temperature sensing device stays in the standing state, the detection unit enables the control unit to determine that the temperature sensing device is to enter the first mode.

In an embodiment, the detection unit includes a touch sensing circuit configured to sense whether the temperature sensing device is touched by the user, and a shake sensing circuit configured to sense a shaking state of the temperature sensing device, so as to enable a temperature measurement function or restart the temperature measurement function.

In order to achieve the above-mentioned objectives, the present disclosure provides a method of automatically switching mode, applied to determine whether a temperature sensing device is to enter or leave from a first mode or a second mode, and the method includes steps of: providing a detection unit, which is electrically connected to a power supply unit and a control unit, in the temperature sensing device; using the detection unit to detect when the temperature sensing device is moved from a standing state, to enable the control unit to determine that the temperature sensing device is to leave the first mode and enter the second mode, and using the detection unit to detect whether the temperature sensing device stays in the standing state, to enable the control unit to determine that the temperature sensing device is to enter the first mode.

In an embodiment, the method further includes steps of: providing the detection unit with a touch sensing circuit and a shake sensing circuit; using the touch sensing circuit to sense whether the temperature sensing device is touched by the user; using the shake sensing circuit to sense the shaking state of the temperature sensing device, so as to enable a temperature measurement function or restart the temperature measurement function.

In an embodiment, the first mode of the temperature sensing device and the method is an automatic detection mode or an automatic power-off state after a standby mode; and the second mode is the standby mode, a temperature measurement mode, or a state after the power-on process.

According to the embodiments of the temperature sensing device and the method of the present disclosure, every time the user operates the temperature sensing device of the present disclosure, such as a forehead thermometer or an ear thermometer, user can have the operational experience that the temperature sensing device is automatically powered on and activated when being picked up from the standing state, or the temperature sensing device can automatically start the temperature measurement mode when being picked up from the standing state, and 3-5 seconds of the waiting time, in average, for checking whether the device is turned on or enters the temperature measurement mode, can be reduced; furthermore, the temperature sensing device of the present disclosure can be directly powered off to reduce the time for power-off countdown, thereby achieving the effect of saving power stored in a battery of the temperature sensing device. Furthermore, the user can restart the temperature measure mode by the shaking manner, without pressing the function button. As a result, the temperature sensing device can provide better user experience.

BRIEF DESCRIPTION OF THE DRAWINGS

The structure, operating principle and effects of the present disclosure will be described in detail by way of various embodiments which are illustrated in the accompanying drawings.

DETAILED DESCRIPTION OF THE PREFERRED EMBODIMENT

Figure 1:
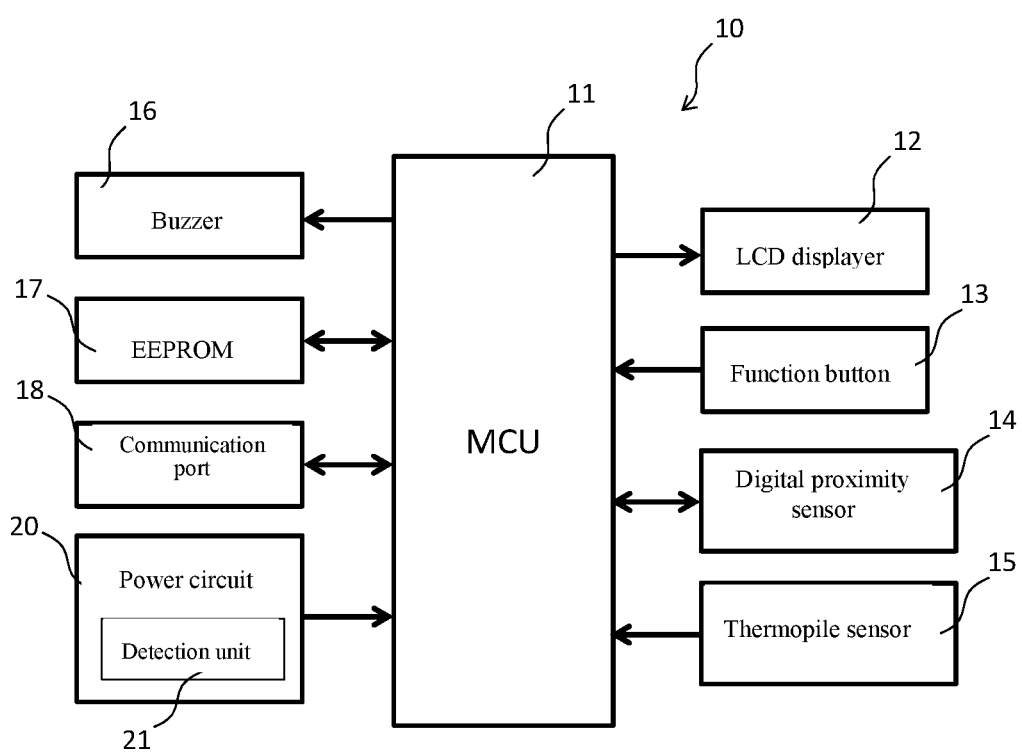
FIG. 1 shows a block diagram of a temperature sensing device of the present disclosure.

The following embodiments of the present disclosure are herein described in detail with reference to the accompanying drawings. These drawings show specific examples of the embodiments of the present disclosure. It is to be understood that these embodiments are exemplary implementations and are not to be construed as limiting the scope of the present disclosure in any way. Further modifications to the disclosed embodiments, as well as other embodiments, are also included within the scope of the appended claims. These embodiments are provided so that this disclosure is thorough and complete, and fully conveys the inventive concept to those skilled in the art. Regarding the drawings, the relative proportions and ratios of elements in the drawings may be exaggerated or diminished in size for the sake of clarity and convenience. Such arbitrary proportions are only illustrative and not limiting in any way. The same reference numbers are used in the drawings and description to refer to the same or like parts.

It is to be understood that, although the terms 'first', 'second', 'third', and so on, may be used herein to describe various elements, these elements should not be limited by these terms. These terms are used only for the purpose of distinguishing one component from another component. Thus, a first element discussed herein could be termed a second element without altering the description of the present disclosure. As used herein, the term "or" includes any and all combinations of one or more of the associated listed items.

Please refer to FIG. 1, which shows a block diagram of a temperature sensing device capable of automatically switching mode, in accordance with the present disclosure. In an embodiment of the present disclosure, a temperature sensing device 10 includes a control unit (MCU) 11, a communication port 18, an EEPROM 17, a digital proximity sensor 14, a thermopile sensor 15, a function button 13, a buzzer 16, a LCD displayer 12 and a power circuit 20. The control unit 11 is electrically connected to other blocks shown in FIG. 1, and configured to determine that the temperature sensing device 10 is to enter or leave from a first mode or a second mode, and perform a temperature sensing function of the temperature sensing device 10. The communication port 18 is configured to receive calibration parameters and a program which both are set externally. The EEPROM 17 is configured to store the calibration parameters and the program which may be accessed by the control unit 11. The digital proximity sensor 14 and the thermopile sensor 15 are configured to sense a human body to obtain measurement data, and provide the measurement data to the control unit 11 for calculation of an ear temperature or a forehead temperature of the human body. The function button 13 is configured to trigger the control unit 11 to perform steps of computing temperature and displaying the measurement data, as shown in FIGS. 3, 5 and 6. After the function button 13 triggers the control unit 11, the control unit 11 controls the buzzer 16 to generate buzzer sound. The LCD displayer 12 is configured to display the ear temperature or forehead temperature of the human body calculated by the control unit 11. The power circuit 20 is electrically connected to the control unit 11 to supply power, and also provides power to other blocks shown in FIG. 1 through the control unit 11 in a working state. The power circuit 20 includes a power supply unit (not shown in FIG. 1) and a detection unit 21. Preferably, the power supply unit can be a battery, a rechargeable battery, a solar cell or the like. In this embodiment, the battery is taken as example of the power supply unit in the following content. The detection unit 21 is electrically connected to the battery and the control unit 11, and configured to detect when the temperature sensing device 10 is moved from a standing state. When the detection unit 21 detects the temperature sensing device 10 is moved from the standing state, the detection unit 21 enables the control unit 11 to determine that the temperature sensing device 10 is to leave from the first mode and enter the second mode; when the detection unit 21 detects that the temperature sensing device 10 stays in the standing state, the detection unit 21 enables the control unit 11 to determine that the temperature sensing device 10 is to enter the first mode.

In an embodiment of the present disclosure, the power circuit 20 defines the power supply circuits between the battery, the control unit 11 and the detection unit 21. Based on the detection result of the detection unit 21, the control unit 11 is enabled to enter the working state or execute the program to complete the setting for power-on process. Based on the state of the temperature sensing device 10 detected by the detection unit 21, the control unit 11 controls the temperature sensing device 10 to enter or leave from the first mode or the second mode. In various embodiments of the present disclosure, the detection unit 21 can be implemented by a G-sensor, a ball rolling switch, a mercury switch or a touch sensing circuit. The first mode or the second mode of the temperature sensing device 10 may be various when the detection unit 21 is implemented by different devices. In different embodiments of the present disclosure, when the detection unit 21 is implemented by a different device, the first mode of the temperature sensing device may be an automatic detection mode, or the state after automatic power-off from a standby mode, and the second mode of the temperature sensing device 10 may be the standby mode, or a temperature measurement mode, or the state after the power-on process.

In an embodiment of the present disclosure, the battery of the power circuit 20 directly supplies power to the control unit 11 and the EEPROM 17. The detection unit 21 is electrically connected to a pin of the control unit 11, and a voltage level on the pin is determined by the detection result of the detection unit 21. In this embodiment, the first mode of the temperature sensing device 10 is the automatic detection mode. In the automatic detection mode, the control unit 11 is supplied with power and in operation, to execute the program stored in the EEPROM 17 to determine the voltage level on the pin. When the detection unit 21 detects that the temperature sensing device 10 continuously stays in the standing state and the voltage on the pin is at low level (L), the control unit 11 keeps monitoring whether the voltage level on the pin is changed until the detection unit 21 detects that the temperature sensing device 10 is picked up or moved from the standing state. After the voltage on the pin is changed to high level (H), the control unit 11 executes the power-on process according to the stored program, so as to start the initial setting for the temperature sensing device 10. As a result, the detection unit 21 enables the control unit 11 to determine that the temperature sensing device 10 is to leave from the automatic detection mode and then enter the power-on process, or the standby mode, or the temperature measurement mode. Furthermore, in order to prevent misjudgment made by the control unit 11 under a condition that the temperature sensing device 10 is accidentally touched to move but the user is not intended to pick up the temperature sensing device 10, the control unit 11 can eliminate this false action by double checking the voltage level on the pin, for example, if the control unit 11 checks that the voltage level on the pin is changed from L to H, and then soon changed from H to L, the control unit 11 does not execute the power-on process and does not leave from the automatic detection mode which is the first mode.

According to conventional technology, when a conventional temperature sensing device enters the standby mode, the conventional temperature sensing device starts a power-off time counting and is powered off automatically after the time counting is completed. In the embodiment of the present disclosure, during a period of the power-off time counting of the control unit 11 in the standby mode, when the detection unit 21 detects that the temperature sensing device 10 stays in the standing state and the voltage on the pin is low level (L), the control unit 11 can directly power off without waiting completion of the power-off time counting, so as to shorten the automatic power-off time and further achieve the effect of saving power stored in the battery.

Figure 2:
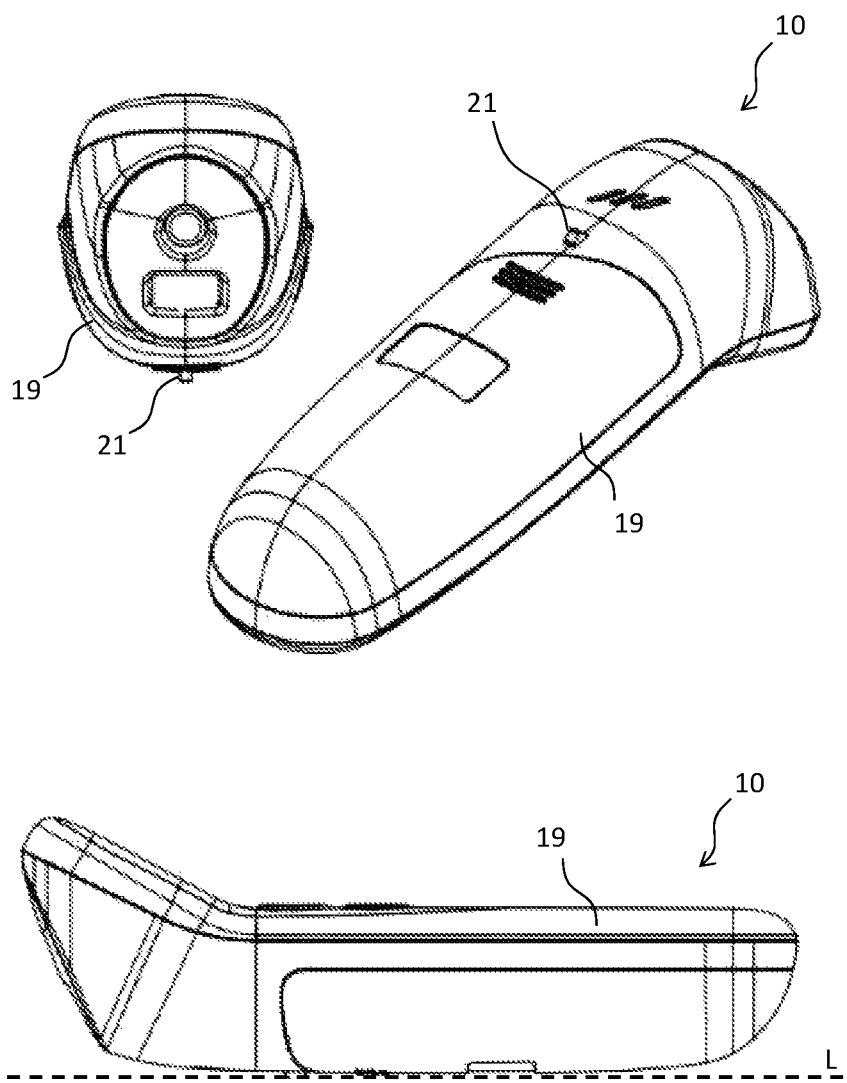
FIG. 2 shows a front view, a perspective view and a side view of the temperature sensing device of the present disclosure.

Please refer to FIG. 2, which shows a front view, a perspective view and a side view of the temperature sensing device of the present disclosure. In an embodiment, the temperature sensing device 10 includes a shell member 19, and all blocks shown in FIG. 1 are disposed inside the shell member 19. The detection unit 21 of the power circuit 20 can be implemented by a pressing switch which is protruded on an outer surface of the shell member 19. Based on the contour design of the shell member 19 shown in FIG. 2 and a gravity applied on the temperature sensing device 10 with the battery mounted inside the shell member 19, the temperature sensing device 10 acts like a tumbler on a plane L no matter the initial placement posture thereof on the plane L, so that the predetermined bottom of the shell member 19 is maintained in contact with the plane L. The pressing switch served as the detection unit 21 is disposed at the predetermined bottom of the shell member 19, and a protrusion part of the pressing switch for triggering is protruded on the surface of the predetermined bottom. As shown in FIG. 2, when the temperature sensing device 10 is placed on the plane L, the predetermined bottom of the shell member 19 is in contact with the plane L to press the protrusion part of the pressing switch, so that the pressing switch is in a pressed state. After the temperature sensing device 10 is picked up from the plane L, the predetermined bottom of the shell member 19 leaves from the plane L, so that the protrusion part of the pressing switch is not pressed and the pressing switch is released from the pressed state. Preferably, the predetermined bottom of the shell member 19 for disposal of the pressing switch can be designed to avoid a holding part of the temperature sensing device 10 for the user's operation, thereby preventing the user from accidently pressing the pressing switch during temperature measurement.

In an embodiment of the present disclosure, in the power circuit 20, the pressing switch can be disposed on a power supply path between the battery and the control unit 11 the power circuit 20, so that the control unit 11 is in the power-off state when the pressing switch is pressed, and when the pressing switch is changed to a not-pressed state from the pressed state, the control unit 11 is supplied power to start power-on process and then enter the standby mode. In other embodiment of the present disclosure, the power circuit 20 can include at least two pressing switches served as the detection unit 21, so as to increase opportunity that at least one of the two pressing switches can be pressed when the temperature sensing device 10 is placed in different postures. The two pressing switches of the power circuit 20 are connected in series, so that any one of the pressing switches being pressed can enable the control unit 11 to enter the power-off state when the temperature sensing device 10 is placed on a nonplanar surface. In another embodiment of the present disclosure, the shell member 19 includes a movably protrusion mechanism, such as the mechanism protruded on the surface of the shell member shown in FIG. 2. When being pressed, the protrusion mechanism can actuate at least one pressing switch of the power circuit 20 inside the shell member 19, so as to achieve the purpose of the above-mentioned embodiments of the present disclosure.

Figure 3A:
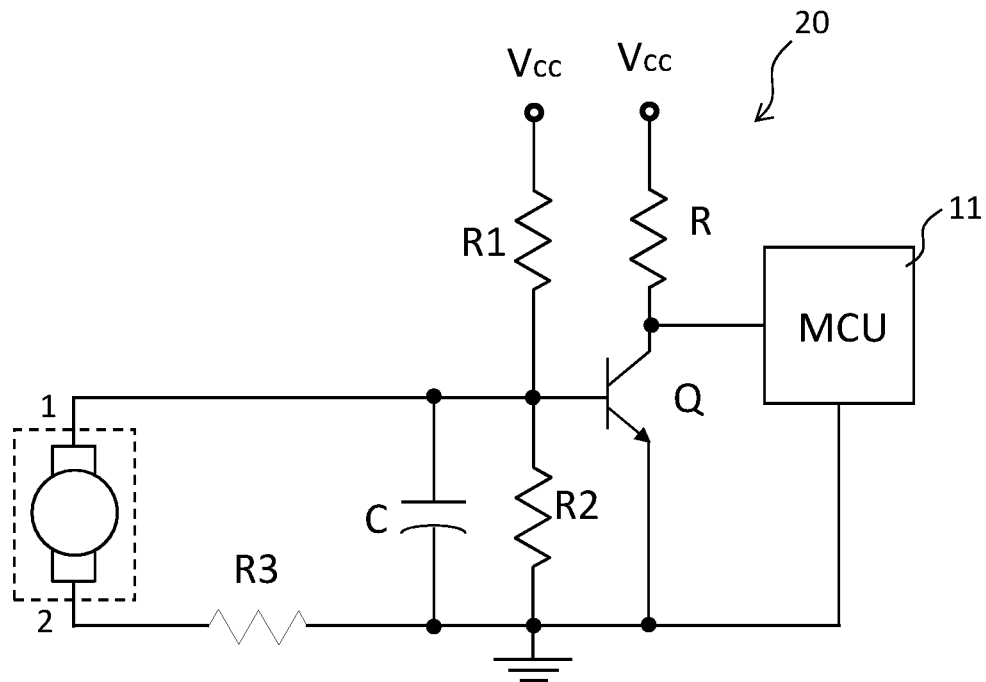
FIG. 3A shows a circuit diagram of a detection unit included in a power circuit of the temperature sensing device of the present disclosure.

Please refer to FIG. 3A, which shows a circuit diagram of the detection unit 21 of the power circuit 20 of the temperature sensing device of the present disclosure. In this embodiment of the present disclosure, the detection unit 21 of the power circuit 20 includes a shake sensing circuit, as shown in FIG. 3A. For example, the shake sensing circuit can be implemented by a full-phase ball rolling switch. The full-phase ball rolling switch includes two electric contacts 1 and 2, and when the ball rolling switch is still placed, the electric contacts 1 and 2 are in conductive status; and, when the ball rolling switch is picked up, the two electric contacts 1 and 2 are in open-circuit temporarily. The shake sensing circuit of the power circuit 20 includes a RC circuit which includes resistors R1, R2 and R3 and a capacitor C, and FIG. 3A shows a connection relationship of these elements. The Vcc terminal is coupled to a power supply unit of the power circuit, such as the battery. The full-phase ball rolling switch in cooperation with the RC circuit can form a loop. A signal sensitivity of the ball rolling switch can be adjusted by changing parameter values of the resistors R1, R2 and R3 and the capacitor C of the RC circuit. When the ball rolling switch is still placed, the two electric contacts 1 and 2 of the ball rolling switch are in short circuiting and conductive status, and a voltage level on the electric contact 1 is determined by a divided voltage which is formed by the resistor R1, and the parallel-connected resistors R2 and R3. When the divided voltage is higher, the transistor Q can be turned on more easily, so that the signal sensitivity of the ball rolling switch becomes higher. When the resistor R1 and the capacitor C have higher resistance and capacitance, respectively, the voltage on the electric contact 1 rises more slowly while the ball rolling switch is shaken, and the transistor Q is turned on less easily, so that the signal sensitivity of the ball rolling switch becomes lower. When the transistor Q is turned on, the control unit 11 is enabled to execute the power-on process to enter the standby mode or the temperature measurement mode. Furthermore, the shake sensing circuit of the power circuit 20 uses the transistor Q for buffer control, so as to make the control unit 11 in the power-off state and prevent overly-large power consumption in standby mode.

In different embodiment of the present disclosure, the shake sensing circuit shown in FIG. 3A can be implemented by a G-sensor or a mercury switch, so as to achieve the purpose of aforementioned embodiment of the present disclosure.

Figure 3B:
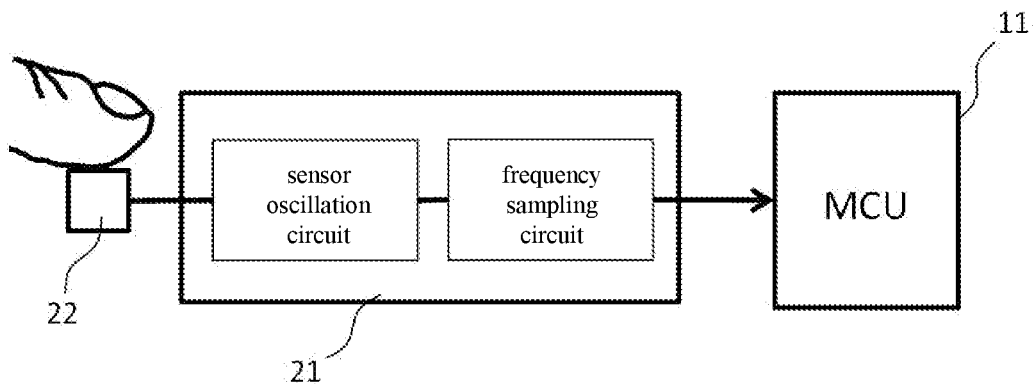
FIG. 3B shows a block diagram of the detection unit included in other power circuit of the temperature sensing device of the present disclosure.

Please refer to FIG. 3B, which shows a block diagram of the detection unit 21 of other power circuit of the temperature sensing device of the present disclosure. In this embodiment, the detection unit 21 of the power circuit 20 includes a touch sensing circuit electrically connected to the power supply unit and the control unit. The touch sensing circuit is configured to sense when the user touches the temperature sensing device, and according to a sensing result, the touch sensing circuit enables the control unit to determine that the temperature sensing device is to leave from the first mode and enter the second mode. The touch sensing circuit includes a sensor oscillation circuit and a frequency sampling circuit. The sensor oscillation circuit includes a sensing pad 22 and an output signal. The frequency sampling circuit is electrically connected to the sensor oscillation circuit, and configured to sample a frequency of the output signal and then output a sampling signal to the control unit 11. When the sensing pad 22 is touched by the user's hand, the sensor oscillation circuit changes the frequency of the output signal, and the frequency sampling circuit then enables the control unit 11 to determine, according to the sampling signal, that the temperature sensing device is to leave from the first mode and enter the second mode.

Figure 4:
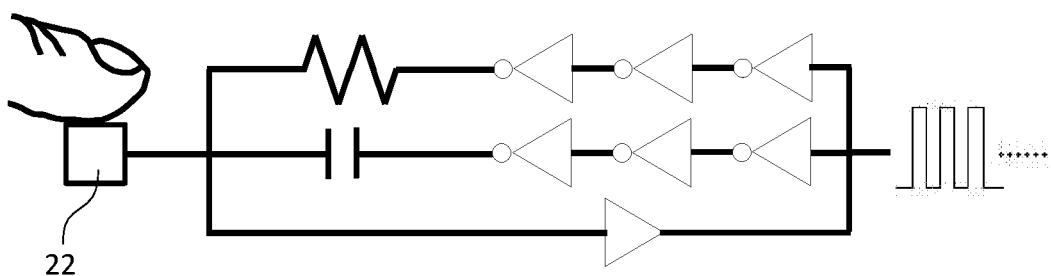
FIG. 4 shows a circuit diagram of a sensor oscillation circuit shown in FIG. 3B.

Please refer to FIG. 4, which is a circuit diagram of a sensor oscillation circuit shown in FIG. 3B. As shown in FIG. 4, the sensor oscillation circuit includes a plurality of invertors and a buffer which are in cooperation with a RC circuit, so as to perform the oscillation effect to output the output signal with the frequency. When the sensing pad 22 is not touched by the use's hand, the sensor oscillation circuit outputs the output signal with a fixed frequency; and, when the sensing pad 22 is touched by the user's hand, frequency shift occurs in the sensor oscillation circuit, so the sensor oscillation circuit outputs the output signal with a lower frequency. For this reason, the frequency sampling circuit of the touch sensing circuit can sample the frequency of the output signal which indicates whether the sensing pad 22 is touched by the user's hand, so that the control unit 11 can determine, according to the sampling signal, that the temperature sensing device is to leave from the first mode and enter the second mode.

Preferably, the sensing pad 22 of the sensor oscillation circuit is disposed on the outer surface of the temperature sensing device, as shown in FIG. 6. When the sensing pad 22 has a larger area, the touch sensitivity is better. The sensing pad 22 can be in a solid circular shape, a solid square shape or a solid rectangular shape, or in a hollow shape. The material of the sensing pad 22 can be PCB copper foil, metal plate, cap spring, conductive foam, conductive rubber, or ITO glass layer.

Figure 5A:
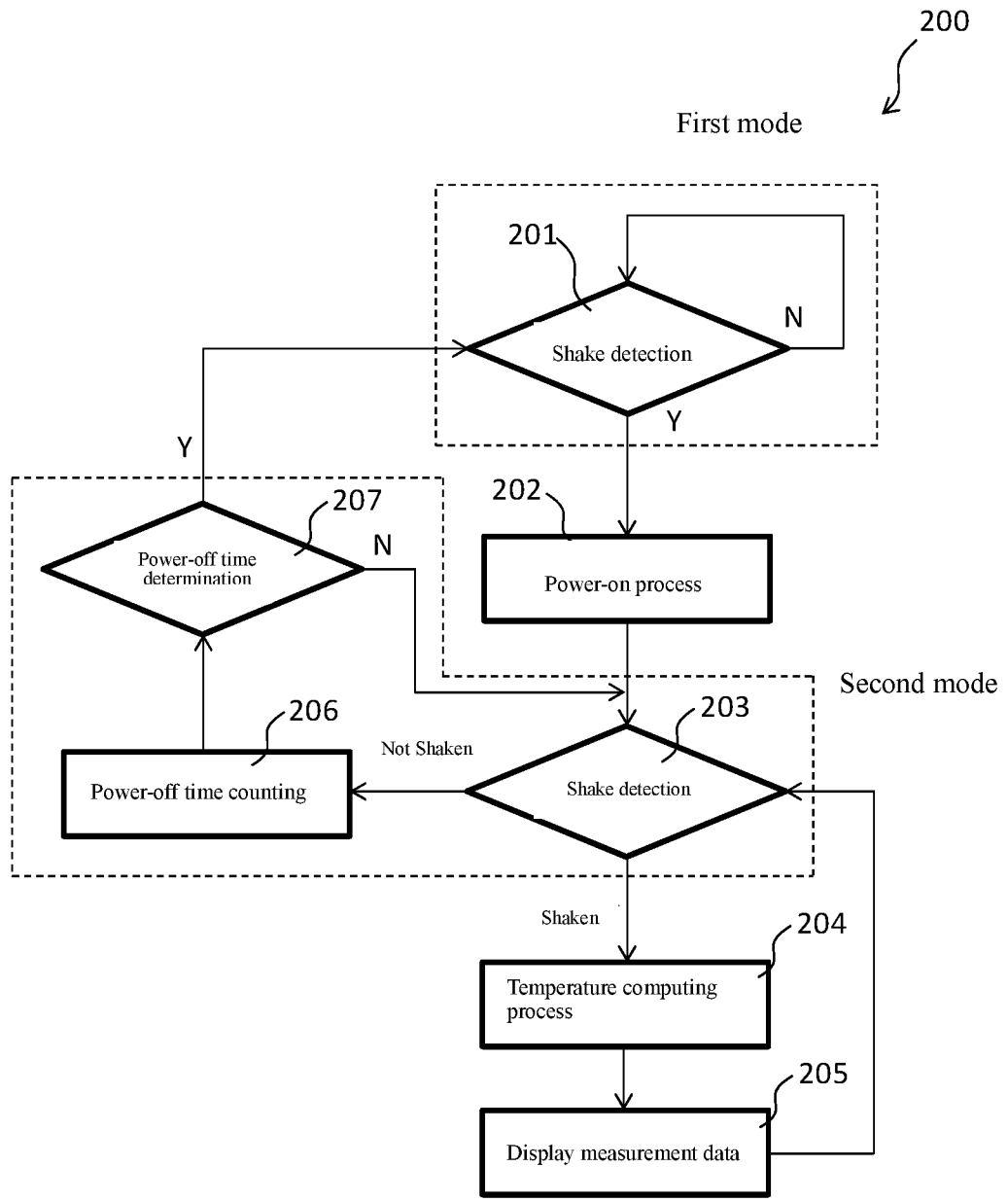
FIG. 5A and FIG. 5B show a flowchart showing the steps in an operation of other temperature sensing device of the present disclosure.
Figure 5B:
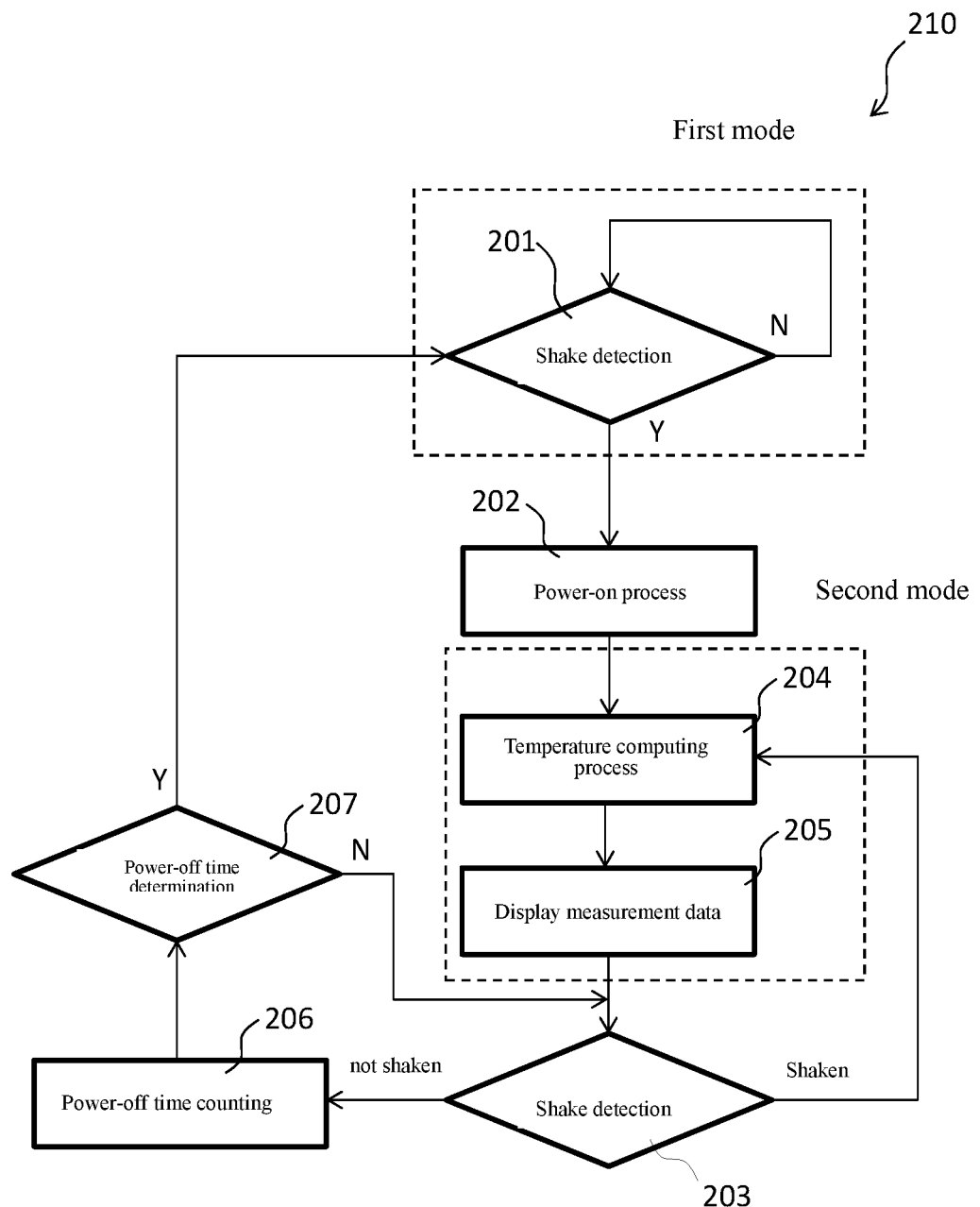
Figure 6:
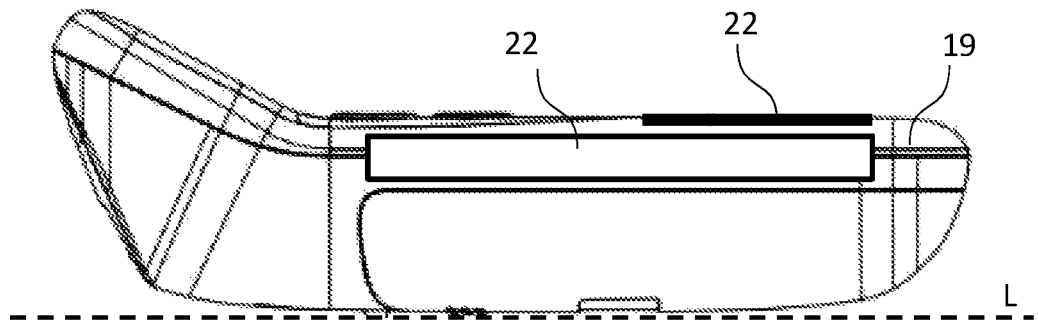
FIG. 6 shows a side view of another temperature sensing device of the present disclosure.

Please refer to FIG. 5A and FIG. 5B, which shows a flowchart showing the steps in an operation of other temperature sensing device capable of automatically switching mode, in accordance with the present disclosure. In this embodiment of the present disclosure, the temperature sensing device 10 includes a shell member 19, and all blocks shown in FIG. 1 are disposed inside the shell member 19. The detection unit 21 of the power circuit 20 can be implemented by the full-phase ball rolling switch, the G-sensor or the mercury switch. A change in the voltage on the pin is associated with the shaking state detected by the detection unit 21, and the control unit 11 can monitor and determine the change in the voltage when being supplied power to work. This embodiment of the temperature sensing device 10 can automatically switch mode according to the method 200 shown in FIG. 5A or the method 210 shown in FIG. 5B. The method 200 is different from the method 210 in a sequential order of the steps thereof, and one of ordinary skill in the art is easy to associate and effortlessly implement the embodiments. In the method 200 shown in FIG. 5A, when the temperature sensing device 10 is shaken, the temperature sensing device 10 leaves the first mode and then enters the second mode in which the temperature sensing device 10 is in the standby state. In this embodiment, the second mode is also called the standby mode. In the method 210 shown in FIG. 5B, after the temperature sensing device 10 is shaken, the temperature sensing device 10 leaves the first mode and then enters the second mode in which the temperature sensing device 10 is in the temperature measurement mode.

Please refer to FIG. 5A. In accordance with the present disclosure, the method 200 of automatically switching mode is performed to enable the temperature sensing device 10 to enter or leave from a first mode or a second mode. The method 200 includes following steps 201 through 207. The step 201 is a step of shake detection. The shake of the temperature sensing device 10 is detected in the first mode (such as the automatic detection mode), and the control unit 11 determines, according to the change in voltage on the pin associated with the detection unit 21, whether the temperature sensing device 10 is to leave from the first mode. When the temperature sensing device 10 is still placed on a plane and the detection unit 21 detects absence of the shake of the temperature sensing device 10, the control unit 11 determines the voltage on the pin to be fixed, such as, at low level, so the temperature sensing device 10 is maintained at the first mode. When the temperature sensing device 10 is moved or picked up, the detection unit 21 detects that the temperature sensing device 10 is shaken and the control unit 11 can detect the change in the voltage on the pin, so the control unit 11 can determine to enter the working state and leave from the first mode. The step 202 is a step of power-on process. After the control unit 11 executes the power-on process according to the program stored in the EEPROM 17, to perform the initial setting of the temperature sensing device 10 and supply power to other blocks shown in FIG. 1, the temperature sensing device 10 enters the second mode, such as the standby mode or the temperature sensing mode.

In this embodiment of the present disclosure, in the second mode, the change in the voltage on the pin of the control unit 11 associated with the shaking state detected by the detection unit 21 can be used to trigger the temperature sensing device 10 to measure temperature and display data. The step 203 is a step of shake detection. In the second mode, the control unit 11 determines, according to the change in the voltage on the pin, whether the detection unit 21 detects the shake of the temperature sensing device 10, and if yes, the control unit 11 executes the step 204 to calculate the temperature value; otherwise, the control unit 11 executes the step 206 to start power-off time counting. In other embodiment of the present disclosure, in the second mode, the control unit 11 can determine whether the function button 13 is pressed, in the step 203, and if the function button 13 is pressed, the control unit 11 executes the step 204 to calculate the temperature value; otherwise, if the function button 13 is not pressed, the control unit 11 executes the step 206 to start power-off time counting. Besides the function of triggering temperature measurement, the function button 13 also has a power-off function. For example, when the function button 13 is pressed for a period, the temperature sensing device 10 enters the power-off state immediately.

Please refer to the flowchart shown in FIG. 5A. In this embodiment of the present disclosure, the step 204 is a step of temperature computing process. The control unit 11 enables the digital proximity sensor 14 and the thermopile sensor 15 to sense human body to obtain measurement data, and after the control unit 11 calculates the ear temperature or the forehead temperature of the human body according to the measurement data, the control unit 11 executes the step 205 to display the measurement data. The step 205 is a step of displaying measurement data. The control unit 11 displays the calculated ear temperature or forehead temperature of the human body on the LCD displayer 12, and is then back to the second mode and execute the step 203 again. The step 206 is a step of power-off time counting. When the temperature sensing device 10 is in the second mode and the detection unit 21 detects absence of the shake of the temperature sensing device 10, the control unit 11 starts power-off time counting and executes step 207 for power-off time determination. The step 207 is a step of counting power-off time. When the control unit 11 determines that the power-off time counting does not reach the power-off time, the control unit 11 is back to the second mode and the control unit 11 executes the step 203 again; when the power-off time counting reaches the power-off time, the control unit 11 can determine that the temperature sensing device 10 is to enter the first mode, and then execute the step 201.

Please refer to FIG. 5B. The method 210 shown in FIG. 5B is different from the method 200 shown in FIG. 5A in the sequential order of the steps, and the steps executing the same content refer to the same reference numeral, such as 201, and 202 and so on. In the method 210, after the temperature sensing device 10 is shaken to leave from the first mode, the temperature sensing device 10 enters the second mode for temperature measurement to execute the steps 204 and 205. The second mode is also called the temperature measurement mode. In order to measure temperature or enter the second mode again, the user can shake the temperature sensing device 10; when the temperature sensing device 10 is still placed, the temperature sensing device 10 is back to the first mode through the step 206.

Please refer to FIG. 6, which shows a side view of another temperature sensing device of the present disclosure. In this embodiment, the temperature sensing device 10 includes a shell member 19 having a bottom, an upper surface and two side surfaces, and all blocks shown in FIG. 1 are disposed inside the shell member 19. The detection unit 21 of the power circuit 20 includes a touch sensing circuit, such as that shown in FIG. 3B, and a shake sensing circuit, such as that shown in FIG. 3A. Preferably, the sensing pad 22 of the touch sensing circuit is disposed on the upper surface or the two side surfaces of the shell member 19, and the sensing pad 22 having larger area can cause better touch sensitivity. The material of the sensing pad 22 can be PCB copper foil, metal plate, cap spring, conductive foam, conductive rubber, or ITO glass layer or combination thereof. Based on the contour design of the shell member 19 and a gravity applied on the temperature sensing device with the battery mounted inside the shell member 19, the temperature sensing device acts like a tumbler on the plane L no matter the initial placement posture thereof on the plane L, so that the predetermined bottom of the shell member 19 is maintained in contact with the plane L, and the upper surface and the two side surfaces are maintained above the plane L; as a result, the user touches the sensing pad 22 easily when holding the shell member 19. In another embodiment, the shell member 19 of the temperature sensing device 10 can be placed in a box, so that the user can touch the sensing pad 22 easily when picking up the temperature sensing device 10.

Figure 7A:
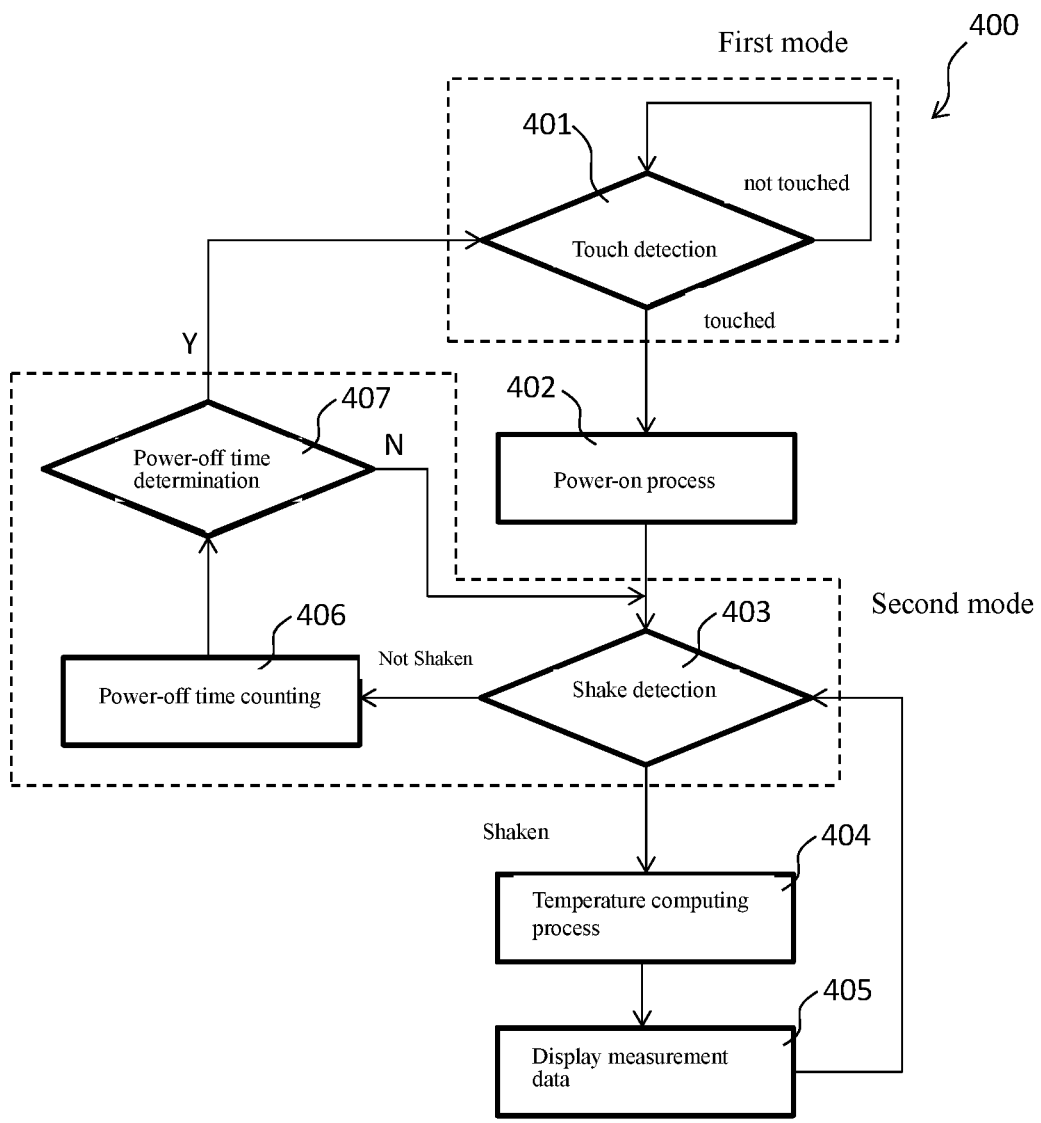
FIG. 7A and FIG. 7B show a flowchart showing the steps in an operation of another temperature sensing device of the present disclosure.
Figure 7B:
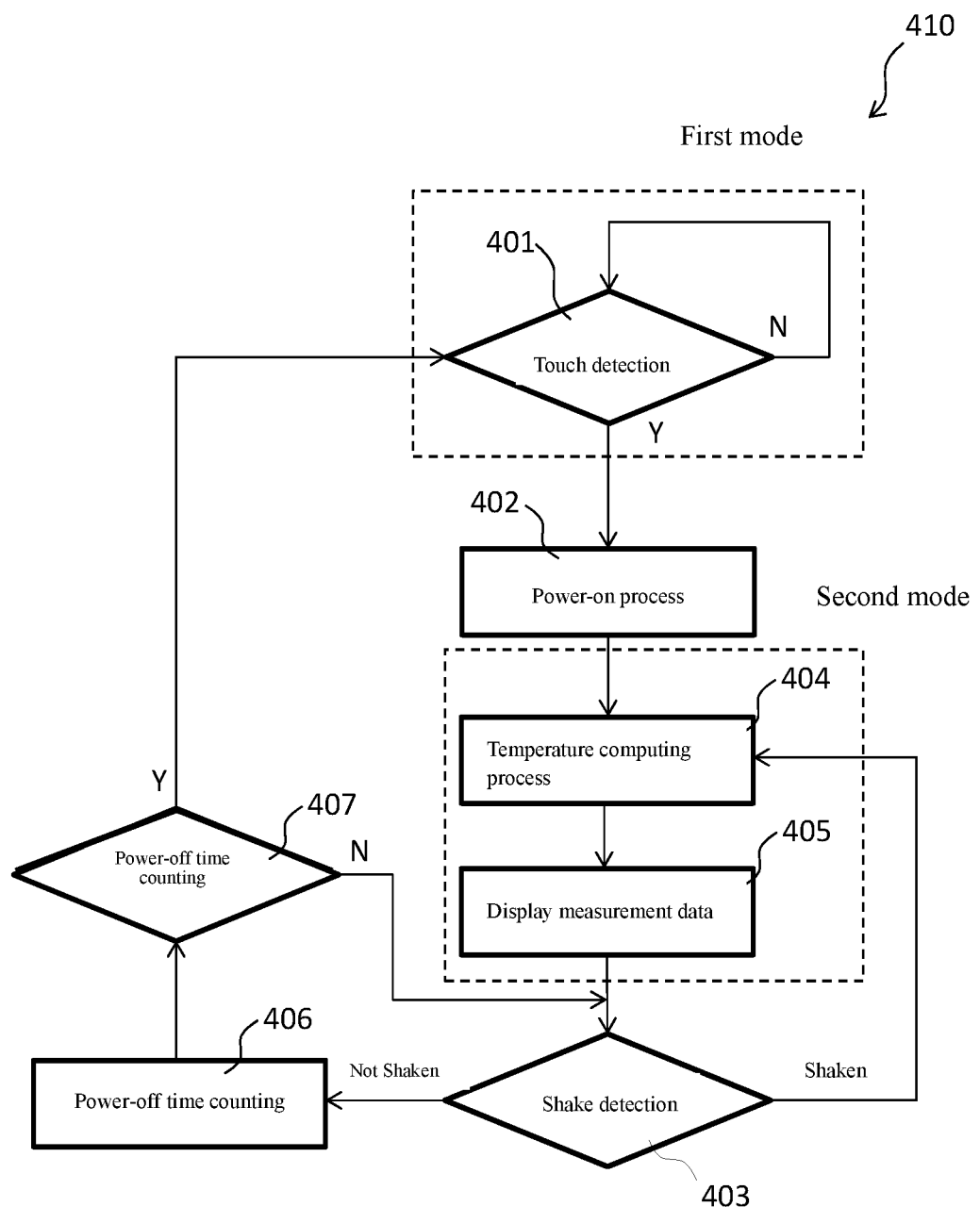

Please refer to FIG. 7A and FIG. 7B, which are flowcharts showing the steps of automatically switching operation mode of another temperature sensing device of the present disclosure. In the embodiment shown in FIG. 6, the operation of automatically switching operational mode of the temperature sensing device 10 can be implemented by the method 400 shown in FIG. 7A or the method 410 shown in FIG. 7B, and the method 400 is different from the method 410 in the sequential order of steps, and the one of ordinary skill in the art is easily to associate and effortlessly achieve the embodiment. In the method 400 shown in FIG. 7A, after the sensing pad 22 is touched to trigger the temperature sensing device 10 to leave from the first mode, the temperature sensing device 10 enters the second mode which is also called the standby mode. In the method 410 shown in FIG. 7B, after the sensing pad 22 is touched to trigger the temperature sensing device 10 to leave from the first mode, the temperature sensing device 10 enters the second mode which is also called the temperature measurement mode.

Please refer to FIG. 7A, which shows the method 400 applicable to trigger the temperature sensing device 10 shown in FIG. 6 to enter or leave from the first mode or the second mode. The method 400 includes steps 401 through 407. The step 401 is a step of touch detection. In the first mode, such as the automatic detection mode, the control unit 11 determines, according to the sampling signal outputted from the touch sensing circuit, whether the temperature sensing device 10 is to leave from the first mode. When the temperature sensing device 10 is still placed and the sensing pad 22 senses absence of the user's touch, and the control unit 11 determines that the sensor oscillation circuit outputs the sampling signal with a fixed frequency, so the temperature sensing device 10 continuously stays in the first mode. When the sensing pad 22 of the temperature sensing device 10 is touched by the user, the control unit 11 determines that the frequency of the sampling signal outputted from the sensor oscillation circuit is changed, so the control unit 11 determines to enter the working state and the temperature sensing device 10 leaves from the first mode. The step 402 is a step of power-on process. The control unit 11 executes the power-on process according to program stored in the EEPROM 17, to perform initial setting of the temperature sensing device 10 and supply power to other blocks shown in FIG. 1. Next, the temperature sensing device 10 enters the second mode such as the standby mode or temperature sensing mode.

As shown in FIG. 7A, the step 403 is a step of shake detection. In the second mode, the control unit 11 determines, according to the change in the voltage on the pin, whether the detection unit 21 detects the shake, and if the detection unit 21 detects that the temperature sensing device 10 is shaken, the control unit 11 executes the step 404 to computing the temperature value; if the temperature sensing device 10 is not shaken, the control unit 11 executes the step 406 to start power-off time counting. In other embodiment of the present disclosure, in the second mode, the control unit 11 can determine whether the function button 13 is pressed in the step 403; if the function button 13 is pressed, the control unit 11 executes the step 404 to computing the temperature value; if the function button 13 is not pressed, the control unit 11 executes the step 406 to start power-off time counting. Besides the function of triggering temperature measurement, the function button 13 also has the power-off function, that is, when the function button 13 is pressed for a period, the temperature sensing device 10 enters the power-off state immediately. The step 404 is a step of temperature computing process. The control unit 11 enables the digital proximity sensor 14 and the thermopile sensor 15 to sense the human body to generate the measurement data, and calculates the ear temperature or the forehead temperature of the human body according to the measurement data, and the control unit 11 then executes the step 405 to display the measurement data. The step 405 is a step of displaying the measurement data. The control unit 11 displays the calculated ear temperature or forehead temperature of the human body on the LCD displayer 12, and the temperature sensing device 10 is back to the second mode, and executes the step 403 again. The step 406 is a step of power-off time counting. When the temperature sensing device 10 is in the second mode and the shake sensing circuit senses absence of the shake, the control unit 11 can start power-off time counting and execute the step 407 to determine the power-off time. The step 407 is a step of power-off time determination. When the control unit 11 determines the power-off time counting does not reach the power-off time, the temperature sensing device 10 is back to the second mode and execute the step 403 again; when the power-off time counting reaches the power-off time, the control unit 11 determines that the temperature sensing device 10 is to enter the first mode, and execute the step 401.

Please refer to FIG. 7B. The method 410 shown in FIG. 7B is different from the method 400 shown in FIG. 7A in the sequential order of steps. The steps executing the same content refer to the same reference numeral, such as 401, and 402 and so on. In the method 410 of the present disclosure, after the sensing pad 22 of the temperature sensing device 10 is touched to trigger the temperature sensing device 10 to leave from the first mode, the temperature sensing device 10 enters the second mode, which is also called the temperature measurement mode, to execute the steps 404 and 405. In order to measure temperature or enter the second mode again, the user can shake the temperature sensing device 10; when the temperature sensing device 10 is still placed, the temperature sensing device 10 is back to the first mode through the steps 406 and 407.

The present disclosure disclosed herein has been described by means of specific embodiments. However, numerous modifications, variations and enhancements can be made thereto by those skilled in the art without departing from the spirit and scope of the disclosure set forth in the claims.

What is claimed is:

1. A temperature sensing device capable of automatically switching operational mode, comprising:
    a control unit configured to determine that the temperature sensing device is selectively to enter or to leave from a first mode, or to enter or to leave from a second mode; and
    a power circuit, electrically connected to the control unit for power supply, comprising
    a power supply unit configured to provide power required by the temperature sensing device,
    touch sensing circuit, and
    a shake sensing circuit, wherein the touch sensing circuit and the sending circuit are electrically connected to the control unit respectively, and, under the first mode, the touch sensing circuit is configured to detect when the temperature sensing device is touched by a user, and then enable the control unit to determine that the temperature sensing device is to leave from the first mode, wherein, after leaving from the first mode, the shake sensing circuit is configured to detect whether the temperature sensing device is shaked by the user, and then enable the control unit to determine that the temperature sensing device is to enter the second mode or return the first mode.

2. The temperature sensing device according to claim 1, wherein, after leaving from the first mode, the shake sensing circuit is configured to detect whether the temperature sensing device is shaked by the user, and then enable the control unit to determine that the temperature sensing device is to enter the second mode that is a temperature measurement mode.

3. The temperature sensing device according to claim 1, wherein, after leaving from the first mode, the shake sensing circuit is configured to detect the temperature sensing device is not shaked by the user for a period of time, and then enable the control unit to determine that the temperature sensing device is to return the first mode.

4. The temperature sensing device according to claim 1, wherein the touch sensing circuit comprises a sensor oscillation circuit which comprises a sensing pad and a frequency sampling circuit configured to sample a frequency of an output signal and output a sampling signal to the control unit.

5. The temperature sensing device according to claim 4, wherein when the sensing pad is touched by a user, the sensor oscillation circuit changes the frequency of the output signal, and the frequency sampling circuit enables the control unit to determine whether the temperature sensing device is to leave the first mode and enter the second mode.

6. The temperature sensing device according to claim 1, wherein after leaving from the first mode, the control unit executes a power-on process.

7. The temperature sensing device according to claim 1, further comprising a function button configured to trigger the control unit to execute processes of computing temperature and displaying measurement data after leaving from the first mode.

8. The temperature sensing device according to claim 1, wherein the shake sensing circuit is configured to sense a shaking state of the temperature sensing device, and a change in voltage on a pin of the control unit which is associated with the shaking state, wherein the shake sensing circuit comprises a full-phase ball rolling switch and a device selected from the group consisting of a G-sensor and a mercury switch.

9. The temperature sensing device according to claim 8, wherein the change in voltage on the pin enables the control unit to execute processes of computing temperature and displaying measurement data.

10. A method of automatically switching operational mode, applied to determine whether a temperature sensing device is selectively to enter a first mode or a second mode or to leave from the first mode or the second mode, the method comprising:
   detecting by a touch sensing circuit when the temperature sensing device is touched by a user under the first mode, and then enabling a control unit to determine that the temperature sensing device is to leave from the first mode; and
   detecting by a shake sensing circuit whether the temperature sensing device is shaked by the user after leaving from the first mode, and then enabling the control unit to determine that the temperature sensing device is to return the first mode or enter the second mode.

11. The method according to claim 10, further comprising detecting by the shake sensing circuit whether the temperature sensing device is shaked by the user after leaving from the first mode, and then enabling the control unit to determine that the temperature sensing device is to enter the second mode which is a temperature measurement mode.

12. The method according to claim 10, detecting by the shake sensing circuit whether the temperature sensing device is not shaked by the user for a period of time after leaving from the first mode, and then enabling the control unit to determine that the temperature sensing device is to return the first mode.

13. The method according to claim 10, further comprising executing by the control unit a power-on process after leaving from the first mode.

14. The method according to claim 10, further comprising sensing by the shake sensing circuit a shaking state of the temperature sensing device, and a change in voltage on a pin of the control unit associated with the shaking state, wherein the shake sensing circuit comprises a full-phase ball rolling switch and a device selected from the group consisting of a G-sensor and a mercury switch.

* * * * *